(12) United States Patent
Farrell et al.

(10) Patent No.: US 7,420,699 B2
(45) Date of Patent: Sep. 2, 2008

(54) SYSTEMS AND METHODS FOR RAPID PROCESSING OF RASTER INTENSIVE COLOR DOCUMENTS

(75) Inventors: Michael E. Farrell, Ontario, NY (US); Peter A. Crean, Penfield, NY (US); Daniel Fleysher, Pittsford, NY (US); William S. Jacobs, Los Angeles, CA (US); Robert E. Lyons, Rochester, NY (US); Thomas Robson, Penfield, NY (US); David E. Rumph, Pasadena, CA (US); Munir G. Salfity, Torrance, CA (US); Mark A. Smith, Rochester, NY (US); Eric J. Thibodeau, Westminster, CA (US)

(73) Assignee: Xerox Corporation, Norwalk, CT (US)

( * ) Notice: Subject to any disclaimer, the term of this patent is extended or adjusted under 35 U.S.C. 154(b) by 913 days.

(21) Appl. No.: 10/740,478

(22) Filed: Dec. 22, 2003

(65) Prior Publication Data

US 2005/0134886 A1    Jun. 23, 2005

(51) Int. Cl.
G06F 15/00    (2006.01)
G06K 1/00    (2006.01)

(52) U.S. Cl. .................... 358/1.15; 358/1.13; 358/1.14; 358/1.18; 358/1.9

(58) Field of Classification Search ................. 358/1.15, 358/1.13, 1.14, 442, 1.9, 1.18; 382/176
See application file for complete search history.

(56) References Cited

U.S. PATENT DOCUMENTS

| | | | | |
|---|---|---|---|---|
| 5,041,918 A | * | 8/1991 | Ishida et al. | 358/442 |
| 5,216,754 A | * | 6/1993 | Sathi et al. | 358/1.14 |
| 5,841,900 A | * | 11/1998 | Rahgozar et al. | 382/176 |
| 5,987,226 A | * | 11/1999 | Ishikawa et al. | 358/1.13 |
| 6,288,799 B1 | | 9/2001 | Sekiguchi | |
| 6,672,212 B1 | * | 1/2004 | Ferlitsch | 101/484 |
| 7,095,529 B2 | * | 8/2006 | Krueger et al. | 358/1.9 |
| 7,202,964 B2 | * | 4/2007 | Christiansen | 358/1.15 |
| 7,339,691 B2 | * | 3/2008 | Ferlitsch | 358/1.15 |
| 7,391,535 B2 | * | 6/2008 | Jacobsen | 358/1.9 |
| 2002/0097416 A1 | * | 7/2002 | Chang et al. | 358/1.13 |
| 2003/0005063 A1 | | 1/2003 | Masao et al. | |
| 2004/0150840 A1 | | 8/2004 | Farrell et al. | |

FOREIGN PATENT DOCUMENTS

EP    0 887 994 A1    12/1998

OTHER PUBLICATIONS

U.S. Appl. No. 10/248,594, filed Jan. 30, 2003, Farrell et al.

* cited by examiner

*Primary Examiner*—Twyler L. Haskins
*Assistant Examiner*—Satwant K Singh
(74) *Attorney, Agent, or Firm*—Oliff & Berridge, PLC

(57) ABSTRACT

The invention generates a page description language compliant data stream, that has been pre-designed and pre-processed to create unique and predictable page element ordering, overlay layout, and for splitting large page elements into multiple independent elements. In this way, multiple processors can be used to render the document without merging the data stream.

11 Claims, 8 Drawing Sheets

| PAGE CONTENT IDENTIFIER | | | |
|---|---|---|---|
| | | Attribute | Eligible Values |
| Global Info | | PPPrelease | XRX_PPP3.0 |
| | | TextAnnotation | none, monochrome, color |
| | | GraphicAnnotation | none, monochrome, color |
| | | ImageAnnotation | none |
| | | VariableData | false |
| TIFF IFD Relevant Information - Per Image (Tag Number) | | ImageList (see below) | One entry |
| | 377 | TargetPrinter | anything if L*a*b* or L*, if CMYK, the printer must match the Device Object |
| | 305 | Software | XRX_PPP3.0 |
| | 254 | NewSubfileType | 16 |
| | 262 | PhotometricInterpretation | 5, 9 |
| | 259 | Compression | TBD, 7 |
| | 293 | T6Options | 0 |
| | 257 | ImageLength | All, per comments |
| | 256 | ImageWidth | All, per comments |
| | 296 | ResolutionUnit | 2 |
| | 282 | XResolution | 300, 600 |
| | 283 | YResolution | same as XResolution |
| | 286 | XPosition | 0 |
| | 287 | YPosition | 0 |
| | 278 | RowsPerStrip | 288 |
| | 258 | BitsPerSample | <8, ...> |
| | 277 | SamplesPerPixel | 1, 3, 4 |
| | 266 | FillOrder | 1 |
| | 274 | Orientation | 1, 3, 6, 8 (constrained by the imaging directions and CTM) |
| | 297 | PageNumber | <0,1> |
| | 530 | ChromaSubsampling | <1,1> |
| | 34732 | ImageLayer | <1,1> |
| non-TIFF Information, per image | | ImageXOrigin | 0 |
| | | ImageYOrigin | 0 |
| | | tif_filename | Unix file name and path, null if the file is embedded. |

FIG. 6B

| FROM FIG. 6A |
|---|
| |
| Comments |
| The file creation application figures this out |
| Consistent with the PS content |
| Consistent with the PS content |
| No image annotation is allowed |
| No VIPP VI is allowed |
| Consistent with the PS content |
| 0=Unknown, 1=Printer-Type1, 2=DC12, 3=Printer-Type2 Note that a single ASCII character is used to represent the target printer so that this value will fit into the IFD Directory Entry. |
| |
| Single-page TIFF (16 if MRC model, 0 if binary) |
| |
| TBD for hints, 4 if G4, 7 if JPEG. |
| Omit tag for contone images. Used for Sanity Check |
| Must be identical to the relevant frame dimension, (in scanlines) given the Orientation and imaging directions. |
| Must be identical to the relevant frame dimension, (in pixels/scanline) given the Orientation and imaging directions. |
| 2 = inches. Used for Sanity Check |
| (Constrained by PostScript Current Transformation Matrix) |
| |
| |
| n if binary, 288 if contone |
| There are SamplesPerPixel values in the array. 1 if binary or Mask, 8 if contone |
| 1 if binary, 1 for Pixel Hints, 1 for gray, 3 if Lab, 4 if CMYK |
| |
| All layers are identical |
| |
| Indicates single page TIFF. Used for Sanity Check |
| Omit tag for Binary Images |
| Omit tag for Binary Images |
| Same as in PostScript, relative to initial CTM |
| Same as in PostScript, relative to initial CTM |
| Identical to the name in the PostScript. |

SYSTEMS AND METHODS FOR RAPID PROCESSING OF RASTER INTENSIVE COLOR DOCUMENTS

BACKGROUND OF THE INVENTION

1. Field of Invention

This invention relates to systems and methods for high performance printing of raster intensive documents.

2. Description of Related Art

Electronic documents can contain a variety of content, most types of content can be displayed or printed, some types cannot be displayed or printed. The major categories of displayable content types are text, line art, and raster images. Raster images are a sampled representation of a view, they are typically created using scanners or digital cameras. Raster images that are in a digital electronic format are comprised of picture elements. To view or print a digital document page the digital image data, whether in bitmap or vector format, must be rendered into pixels for display on a monitor or for printing on a print device. While printing capabilities are no longer limited by print engine speed, converting a page image from an application program format to a page map is a time consuming process. For instance, the high performance requirements of a "print-on-demand" environment may require the transfer of approximately 30 megabytes of data per second to the printer. For example, a page may contain text, photographs, constant color areas or graphs, such as pie charts and the like. The processing time required to generate a pagemap of such an image is significant.

Raster images captured using sampling devices, such as scanners or digital cameras, are typically stored and transmitted in the capture resolution and the capture device colorspace. Scanners and digital cameras typically utilize image capture technology that operate in RGB colorspace, printing generally uses CMYK colorspaces, hence a color transformation is often required to print raster images.

Raster images are often incorrectly sized or oriented for their intended use on a page, hence spatial transformations are often part of the process for rendering the images on a printed page. Spatial transformations typically employed in printing of color images include scaling, rotation, and mirroring.

To transform the page in an electronic format at a workstation, to a tangible document form, the application program generates a specification of the page content in a page description language. A page description language is a method of describing printed page in a printer independent format. A page description language establishes an interface between a print driver, or client, and a print server, or printer. No single standard page description language presently exists, and, as a result, a number of industry standards have emerged. Existing page description languages include, for example, PostScript™.RTM., Hewlett Packard™ Printer Control Language, Interpress™ page description language, and the like.

The application program generates the page specification in the form of a datastream of page description code which contains information regarding each of the objects on the page, the page address for each of the objects, and the format in which the objects appear on the page, such as the applicable font, shading, size, angle, and the like. The datastream is transferred from the workstation to a printer, where the datastream is converted into a pagemap. A pagemap is a collection of bits which each represent one point or dot on the page. A pagemap may also called a bitmap or raster image. To render, or translate, the digital data of a pagemap into physical output, raster image processing is used.

Raster image processing translates digital image data into a representation that can be consumed by the display device. Some raster image processing systems and methods translate digital image data on a line-by-line basis for output to a display or printer. Traditionally, printing systems have utilized a single processor which interacts with printer software to interpret a datastream and render a pagemap. The printer software interprets the objects, page addresses and print attributes in the datastream, generates bit maps of the objects, and merges the bit maps into the pagemap at the appropriate page address. An application program arranges the objects in the datastream in the order in which they were created by the application program, thus enabling the datastream to be rendered sequentially while maintaining the proper relative relationship of the objects on the page.

Known raster image processing systems and methods translate an entire image before outputting the image to a display or printer and require a large amount of memory to accommodate the entire pagemap. In addition, the processing time needed to generate multiple pages is great because an entire page must be rendered, or transformed to an optimal print image, prior to output. Further, the system must wait for the output operation to be completed before beginning to render the next page. Thus, while known systems may be beneficial in terms of maintaining the correct placement and relationship of the objects on the page, they are not practical in a high-speed printing system.

Other methods of raster image processing have been developed that segment or parse a pagemap into "bands", and separately rasterize and output each band to a print engine. Such methods are useful when memory preservation is limited or when printer hardware does not use a page description language and a host computer system is required to interpret the page description language and deliver the image. Thus, "banding" was developed as a way to circumvent the limitations of printing hardware or software. Such methods enable multiple bands to be rasterized and output simultaneously in parallel, thereby reducing the overall processing time.

However, these methods have drawbacks which severely limit any performance benefits. Because the objects may be presented in any order, the rendering or transforming software may not allow the first band to be output until the last object is examined. This is because the last object may possibly effect the first band.

To resolve the difficulty of improving print engine performance, attempts have been made to support parallel page processing using Portable Document Format as the page description language format. Because of page independence, Portable Document Format processing can be distributed across multiple processors. The strategy has been to improve page processing time not by processing individual pages faster, but rather by dividing the print job into separate pages thereby assigning the raster image processing of each page to a different processor. Though the processing time for each page will not change, with more pages being processed at the same time, the overall processing time required may be reduced significantly.

SUMMARY OF THE INVENTION

Raster image processing of color digital front end (DFE) documents further slows the processing of images in a digital electronic format to a format suitable for display on a monitor or for printing by a print device. Typical performance for raster image processing of color digital front end documents is in the range of one page per minute for a standard letter size 600 dpi by 600 dpi image. Since print engine performance can be at least two orders of magnitude faster, color decomposition is clearly a major color printing performance bottleneck. Thus, printing documents composed of color rasters via known print paths is slow and there is limited opportunity to enhance image quality by utilizing the image information available from capture stations. The present invention recognizes a need for rapidly processing raster intensive documents.

Various exemplary embodiments of the systems and methods of this invention provide sustained print performance, increased image quality and/or interoperability. By providing a mechanism that describes page content attributes of a document via a custom page description language construct, a raster image processor is enabled to route the page content attributes to one of several available rendering paths.

In various exemplary embodiments, the systems and methods of this invention generate a page description language (PDL) compliant data stream, such as PostScript™, that has been pre-designed and pre-processed to create unique and predictable page element ordering, overlay and layout, and for splitting large page elements into multiple independent elements. In this way, multiple processors can be used to render the document without merging the data stream. Further, in various exemplary embodiments, print speed may be increased because complicated conflict checking and/or layering verification need not be performed.

Various exemplary embodiments of the systems and methods according to this invention represent raster image data, and associated rendering hints, to be conveyed to a print controller separately from a print submission. In various exemplary embodiments a single page TIFF-FX MRC (tagged information file format-fax extended multi-raster content) image file with pixel rendering hints is associated with a single-layer color image. This image file may have additional characteristics, such as sequence of elements, structure, colorspace, compression, and/or the like. The raster image data may be conveyed to a print controller by pushing the data using the file transfer protocol (FTP). The raster files are referenced by local file references, i.e., pathways in the page description language. In various exemplary embodiments the raster files are referenced locally separate from, rather than embedded in, the page description language.

In various exemplary embodiments of this invention, document structure and any annotations are described using, for example, Adobe™ Postscript 3™ with coding that will cause the raster image file to print correctly if presented to a Postscript™ decomposer. Postscript 3™ provides native support for file references, deflate decompression, ICC profiles, and compatibility with Variable-data Intelligent Postscript Printware.

In various exemplary embodiments of this invention, page content attributes are described, for example, using Postscript 3™ comments, such as, "%%XRX (parm1, parm2, ... )", that convey information about the page. In various exemplary embodiments of the systems and methods according to this invention, the information conveyed may include, for example, colorspaces, such as CIEL*a*b*, Sfida CMYK, SWOP CMYK, the number of rasters on a page, raster resolution, and/or the like.

In various exemplary embodiments of this invention, print submission and print instructions are provided, for example, using the internet print protocol (IPP) with custom extensions for production printing. Internet print protocol is compliant with enterprise coherence strategies and standards.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods according to this invention will be described in detail, with reference to the following figures, wherein:

FIGS. 6a-6b illustrate one exemplary embodiment of a set of page content attributes usable by the systems and methods according to this invention.

DETAILED DESCRIPTION OF PREFERRED EMBODIMENTS

Figure 1:
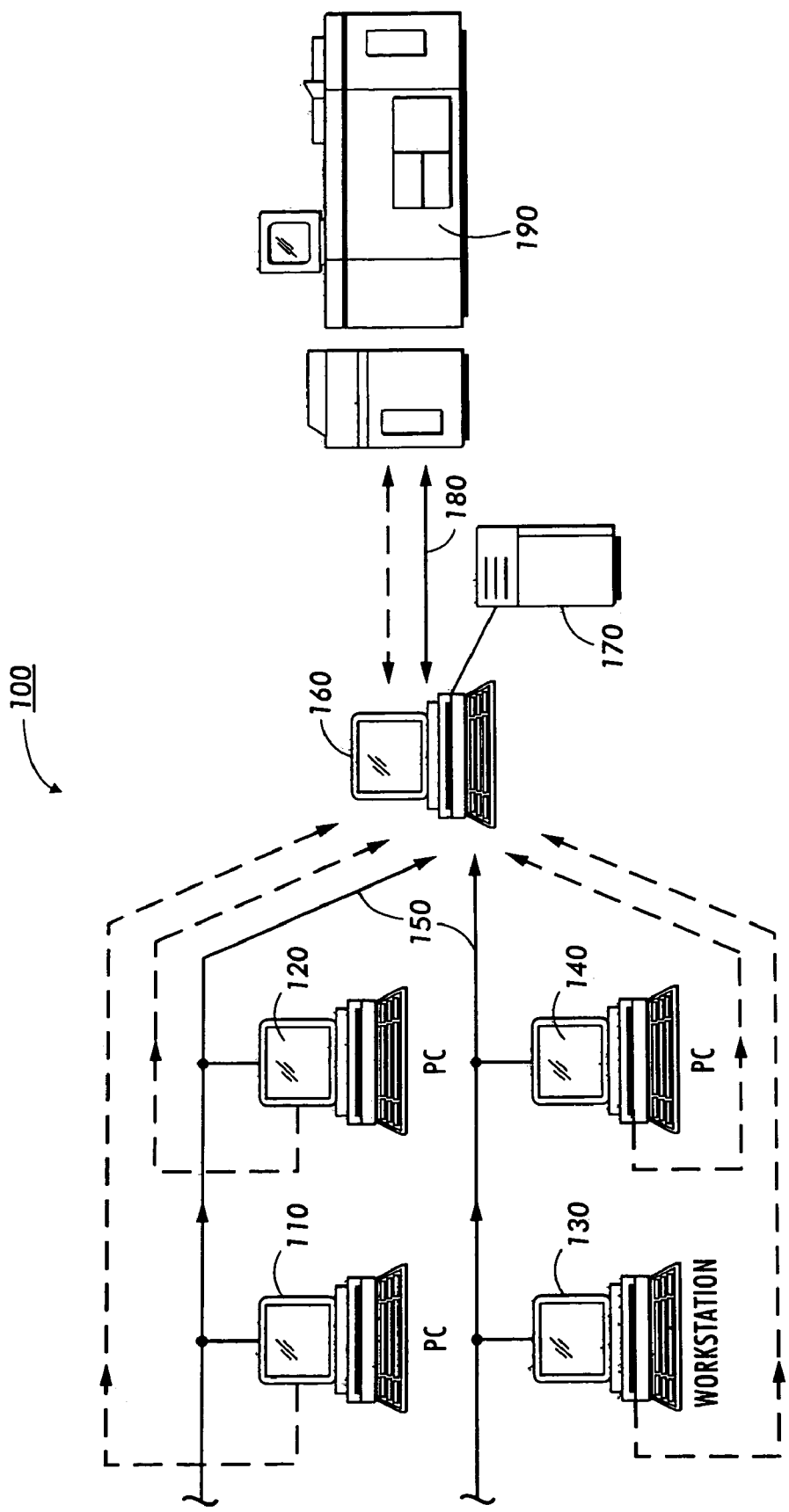
FIG. 1 is a schematic view of an exemplary printing arrangement including a plurality of client workstations connected to a printing apparatus by a server.

FIG. 1 shows a schematic view of a printing arrangement 100 including a plurality of input devices 110, 120, 130 and 140 connected to a printing apparatus 190 by a server 160 via a link 180. The link 180 can be any known or later developed device or system for connecting an input device 110, 120, 130 and 140 to the printing apparatus 190, including a direct cable connection, a connection over a wide area network or a local area network, a connection over an intranet, a connection over the Internet, or a connection over any other distributed processing network or system. In general, the link 180 can be any known or later developed connection system or structure usable to connect the input device 110-140 to the printing apparatus 190.

As shown in FIG. 1, the plurality of input devices 110, 120, 130 and 140 may be personal computers, or workstations. Further, the input devices may be any other known or hereafter developed input device, such as scanners and the like. The user input devices 110, 120, 130 and 140 are coupled via one or more networks 150 to a server 160. In various exemplary embodiments the server 160 may be any suitable interface for receiving print jobs from a input device 110, 120, 130 and 140 via one or more networks 180. The server 160 may include a memory 170 having suitable capacity for temporarily storing files pending processing by the printing system 190. The memory 170 may be large enough to support long term storage of such files or parts of such files. Although a printer having a memory is described, in various exemplary embodiments one or more remote memories may be provided for this purpose.

In various exemplary embodiments one or more of the user input devices 110, 120, 130 and 140 may be used, for example, to create page description language documents including text, image data, and/or the like. In various exemplary embodiments of this invention, the page description language documents may be sent by the server 160, through one or more links 150 to one or more printing systems 190.

In various exemplary embodiments of the systems and methods according to this invention, the printing arrangement 100 may include one or more high speed printers 190 for processing jobs in accordance with the instructions input through a job ticket 220 accompanying each print job. Although a single printer 190 is shown, in various exemplary embodiments of the systems and methods according to this invention, a plurality of printers, either at a single central location or at several remote locations, is contemplated. Additionally, while the networks 150 are described as being separate or independent of each other, it should be appreciated that in various exemplary embodiments a single network may also be used. In various exemplary embodiments of this invention, the network 150 can be a local area network, a wide area network, an intranet, the Internet, or any other distributed processing and storage network.

In various exemplary embodiments, an image is captured and a segmented or "fast path" raster image file is created using one or more of the user input devices 110, 120, 130 and 140 or an associated input device, such as scanners and the like. "Fast path" processing is a process of segmenting a file or files for independently routing a page to multiple rendering paths, as in a co-pending U.S. patent application Ser. No. 10/248,954, entitled "Method And Systems For Structuring A Raster Image File For Parallel Rendering By Multiple Processors In Streaming Mode". The created raster image file does not include vector data, but rather includes rendering hints or "metadata" for describing edge boundaries, resolution, and/or the like.

In various exemplary embodiments of this invention, a target printer 190 is selected either directly or indirectly by a user and the images are transferred from the user input device 110, 120, 130 and 140 to printer memory. In various exemplary embodiments of this invention, the images may be transferred, for example, by file transfer protocol, or the like. In various exemplary embodiments of this invention, the printer memory may include a disk drive or other known or later developed memory devices. In various exemplary embodiments of this invention, the printer memory can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In various exemplary embodiments of this invention, one or more page description language files referencing the fast path raster image file is then created on one or more of the user input devices 110, 120, 130 and 140 to provide page content attributes. In various exemplary embodiments of this invention, the page description language may be Adobe's PostScript™ or other known or later developed page description language languages suitable for purposes described herein. The page description language file may be used to describe pointers for headers, footers, page numbers, other non-raster image data, and/or the like. The page description language file may also be used to express image placement on a sheet by offering a page transform matrix and coordinate system. Although use of a page description language is contemplated, a page description language file may not be necessary in the execution of various exemplary embodiments of the systems and methods according to this invention. For example, in various exemplary embodiments, if the printed pages consist of only captured images, use of a page description language may not be necessary or desired.

Figure 2:
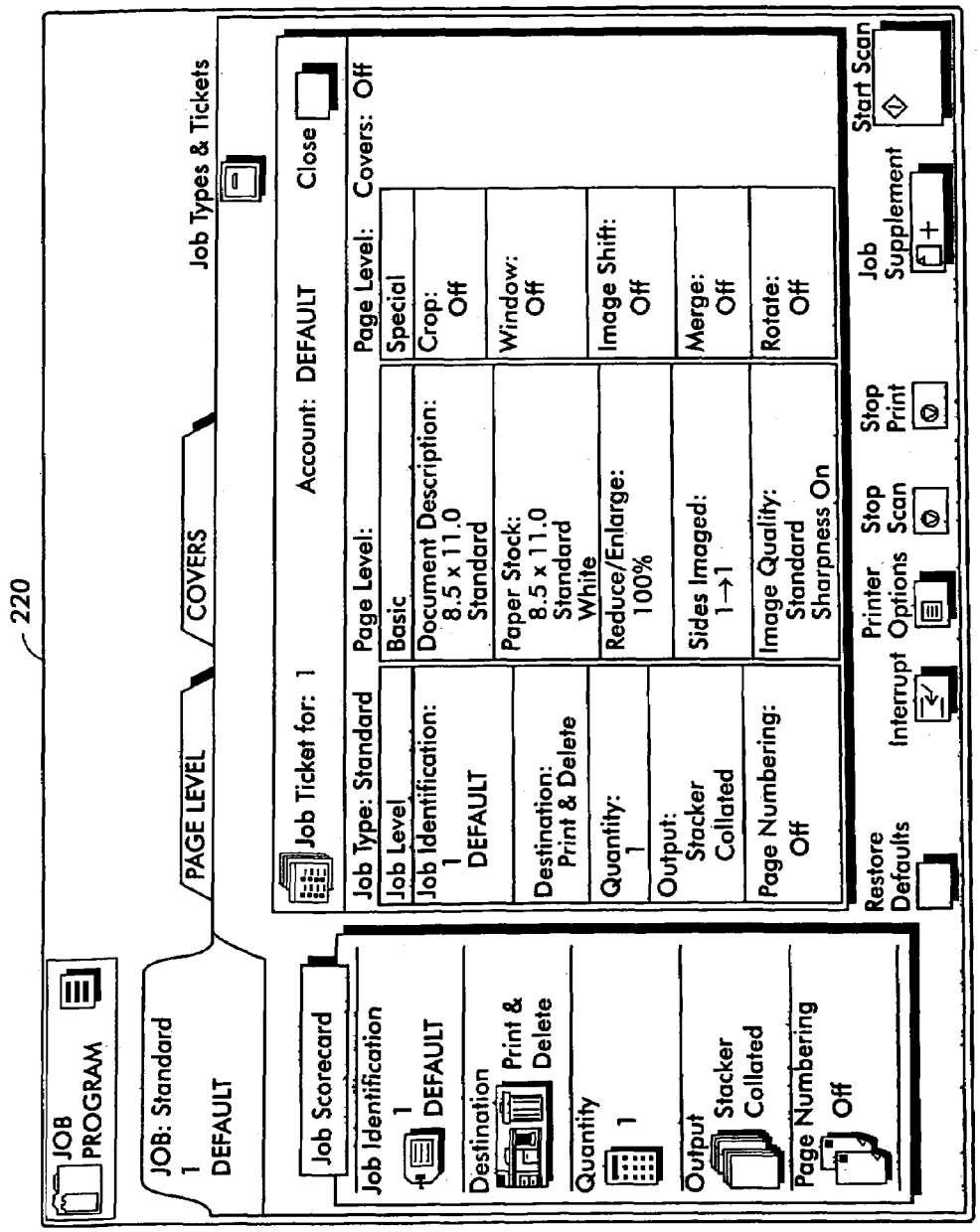
FIG. 2 is a schematic view of an exemplary job ticket.

FIG. 2 shows a schematic view of an exemplary job ticket 220. In various exemplary embodiments, the job ticket 220 is created as a stand alone file at one or more of the user input devices 110, 120, 130 and 140. In various exemplary embodiments, the job ticket 220 may be in the form of an XML (eXtensible Markup Language), or other SGML (Standard Generalized Markup Language) format, for transfer to the memory of the printer 190. The job ticket 220, and the page description language files referencing the fast path raster image files, are transferred to the memory of the printer 190 as two distinct objects that together may be referred to as a "print job". The print job may consist of, for example, processing instructions sent to the selected printer 190 via Internet Print Protocol, or the like.

The print job, including the job ticket 220 and the page description language files, is transferred to the printer 190 and is received and spooled in the memory of the printer 190. Although exemplary embodiments contemplate that the print job may be received and spooled in its entirety prior to processing, the print job may also be streamed with processing beginning prior to receipt of the entire print job.

Figure 3:
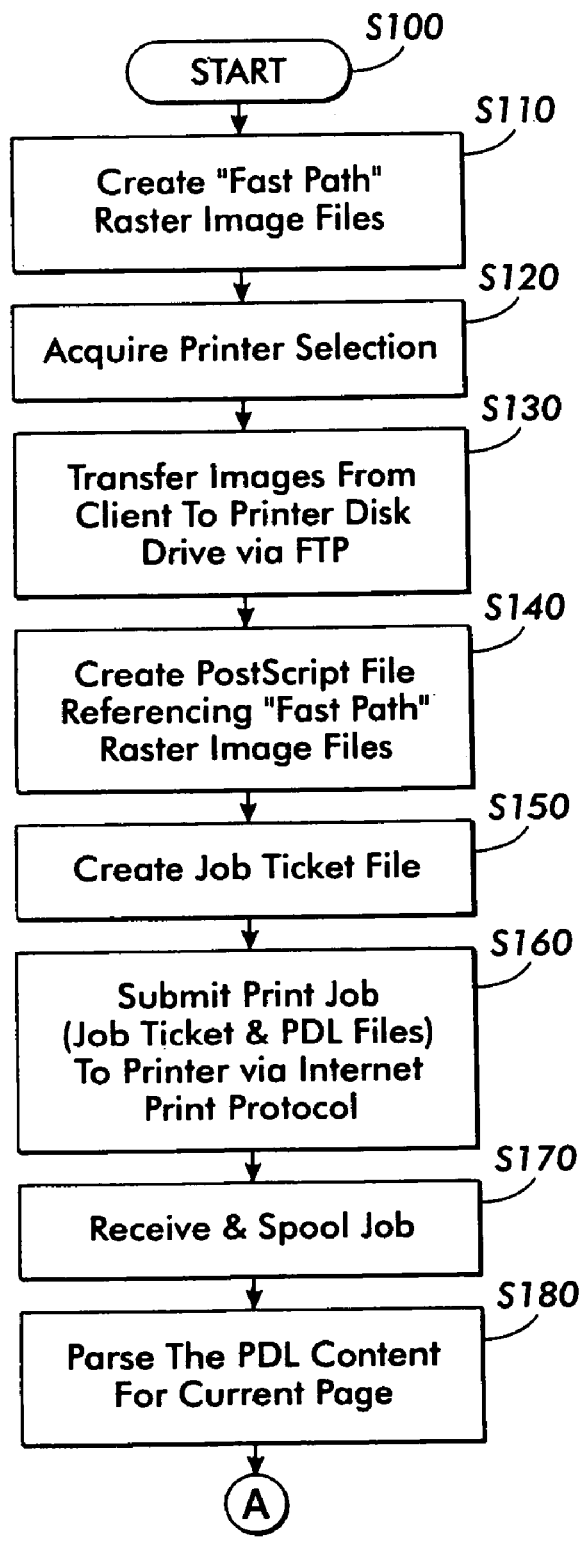
FIGS. 3-5 are flowcharts illustrating an exemplary embodiment of a method according to this invention.
Figure 4:
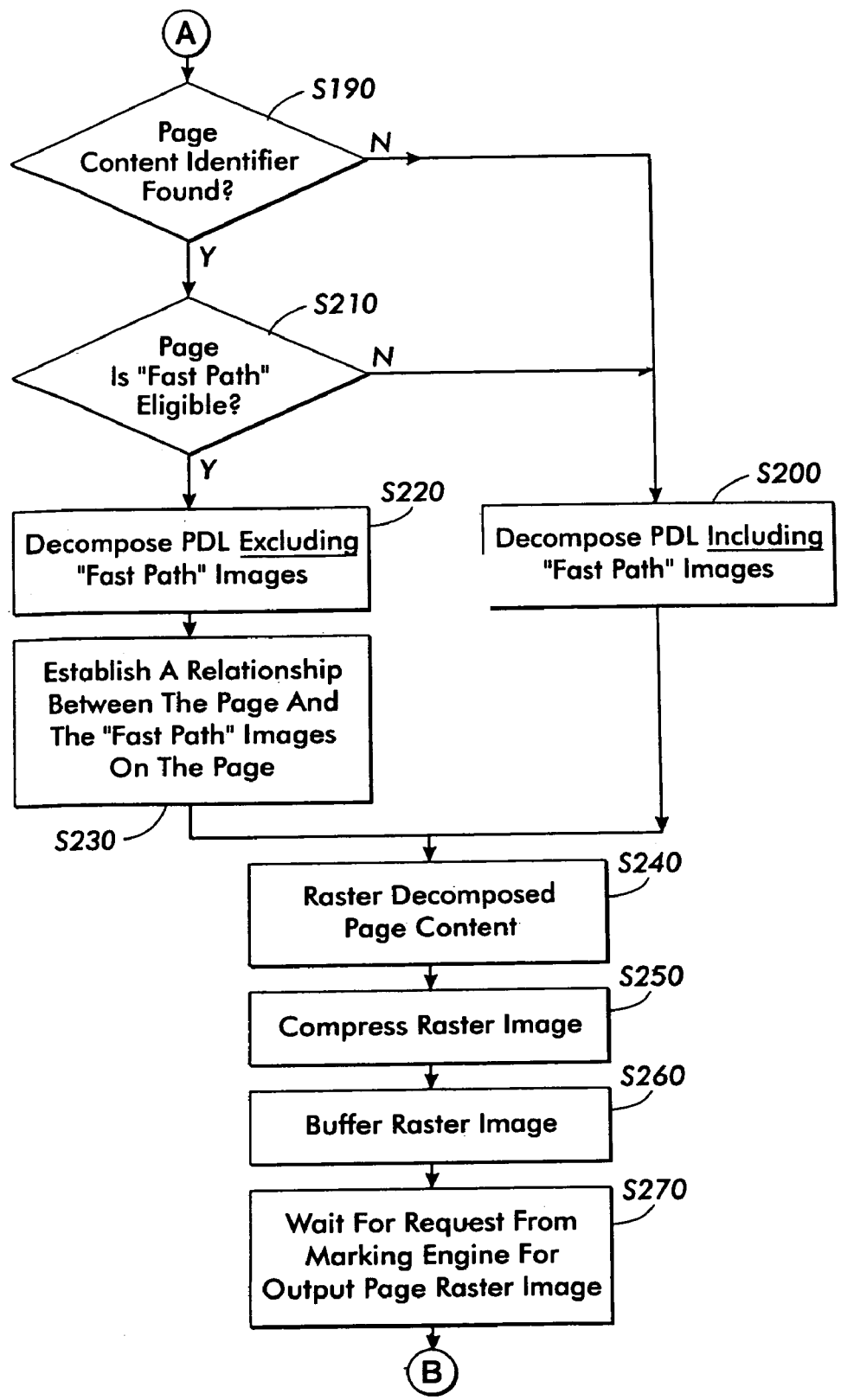
Figure 5:
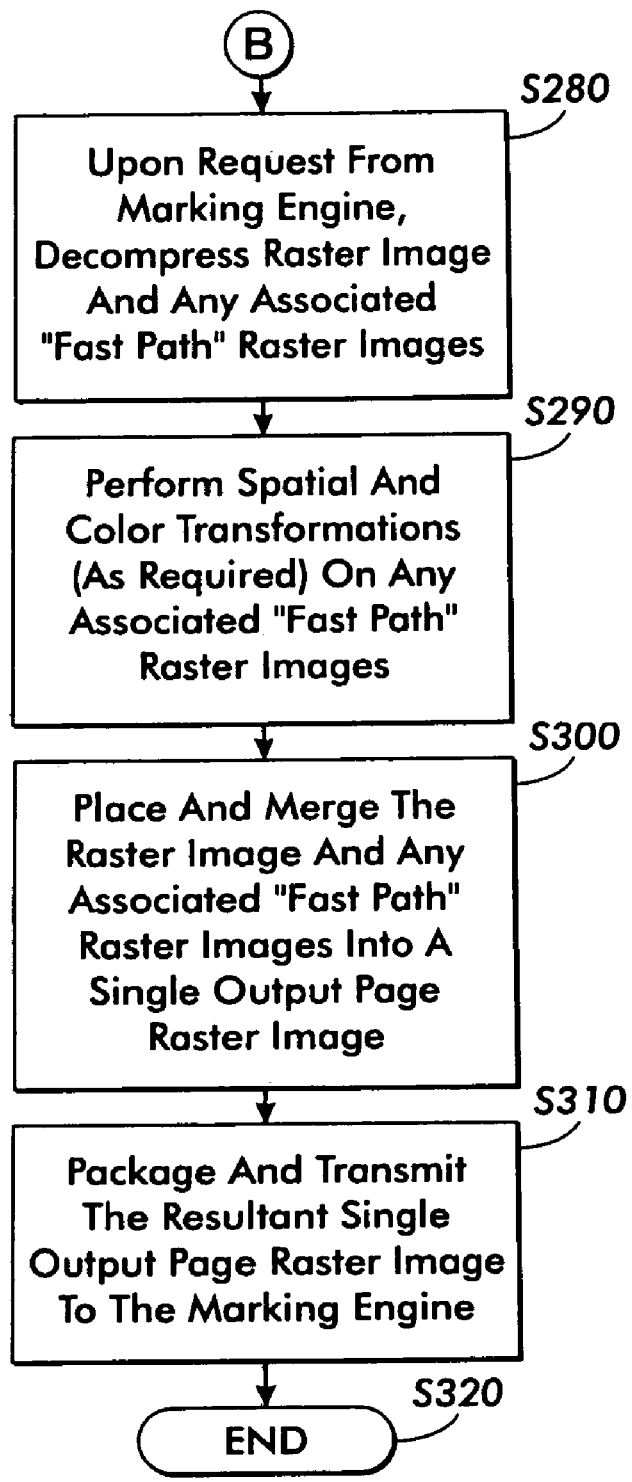

FIGS. 3-5 show a flowchart outlining an exemplary embodiment of a method according to this invention for improving print performance and image quality using a color capable print path for raster intensive documents. Operation begins at step S100. In step S110 an image is captured and a fast path raster image file is created. A fast path raster image file is a file that is segmented, according to this invention, for independent routing. In various exemplary embodiments the image may be captured using one or more of a digital camera, a scanner, a locally or remotely located computer, or any other known or later developed device that is capable of generating electronic image data. Similarly, the image may be captured by any suitable device that stores and/or transmits electronic image data, such as a client or a server of a network. The created image file does not include vector data, but leaves includes rendering hints or "metadata" for describing edge boundaries, resolution and/or the like. Operation continues at step S120.

In step S120, a target printer is selected. In various exemplary embodiments the target printer may be selected either directly by a user or indirectly through processing instructions or programming.

Next, in step S130, images are transferred from the client to the memory of the selected printer via file transfer protocol. Printer memory can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writeable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like. Operation continues to step S140.

In step S140, a page description language file referencing the fast path raster image file is created. In various exemplary embodiments the page description language may be Adobe's PostScript™ or other known or later developed page description language. The page description language file is used to describe pointers for headers, footers, page numbers, other non-image data, and/or the like. The page description language file may also be used to express image placement on a sheet by offering a page transform matrix and coordinate system, and the like. Although various exemplary embodiments include use of a page description language, it is to be understood that no page description language file may be necessary in the execution of other various exemplary embodiments of the systems and methods according to this invention. Operation continues to step S150.

Next, in step S150, a job ticket is created for a print job. In step S160, the job ticket and page description language files are transferred to a printer via, for example, internet print protocol. Although various exemplary embodiments include use of the internet print protocol, it is to be understood that other file transfer protocols may be used in the execution of other various exemplary embodiments of the systems and methods according to this invention.

In step S170, the print job is received and spooled in a memory. It is contemplated that the print job may be received and spooled in its entirety prior to processing, or in the alternative, may also be streamed with processing beginning prior to receipt of the entire print job.

In step S180, processing of the print job begins and the page description language content for the current page being processed is parsed. In step S190, a determination is made if a page content identifier is detected in the page description language. If no page content identifier is detected then operation continues to step S200. At step S200, the page description language file and, the fast path images are decomposed.

However, if a page content identifier is detected in step S190, then a determination is made if the page is fast path eligible in step S210. A page may not be fast path eligible, for instance, if placement of the page components will not fit on to the sheet because of overlapping image coordinates. FIGS. 6a and 6b show an exemplary embodiment of a set of page content attributes usable by the systems and methods according to this invention to determine if a page is fast path eligible. If the page is not fast path eligible, then operation continues to step S200 where the page description language and Fast Path images are decomposed.

If the page is fast path eligible, then the page description language file, excluding fast path images, is decomposed in step S220 to determine the arrangement of the page and page information. Such page arrangement and page information may include, for example, the location of a header, footer and/or page number, and the like. Operation continues to step S230.

In step S230, a relationship is established between the decomposed page and the fast path images on the page. The established relationship is logical and includes placement coordinates and sufficient information to retrieve fast path raster image files from the printer memory. Operation continues to step S240.

In step S240, the decomposed page content, i.e., page description language files and the fast path images are rasterized to construct a pixel map of the page using primitive imaging operators and glyphs. Both vector graphics and/or text are converted into bitmapped images. Next, in step S250, the rasterized image is compressed using compression techniques. At step S260 the compressed raster image is buffered to allow decomposition to run asynchronously to a print marking engine.

In step S270, operation is paused until a request from the printer for output of the page rasterized image is received. In step S280, operation resumes upon request for the printer. The compressed page rasterized image, and any associated fast path images, are decompressed. In various exemplary embodiments such decompression is performed by digital signal processor chips. In various exemplary embodiments Equator™ digital signal processor chips are used as hardware accelerators. For example, each Equator™ channel has 32 megabytes of dedicated RAM. Because of overhead and processing, only a part of this memory is actually available to accommodate image data. Even if compressed 10:1, a single standard letter size 600 dpi by 600 dpi 32 bit color image is 13 megabytes, expanding just one page of this size will require 128 megabytes. The use of multiple plane TIFF FX multi-raster content files, possibly including rendering hint information, introduces additional complexities. Operation continues to step S290.

In step S290, spatial and color transformations are performed on any associated fast path raster images is performed as desired. In various exemplary embodiments such spatial transforms may include, for example, scaling, rotation, shifting, and/or the like. In various exemplary embodiments examples of color transform include, for example, color space conversions, application of tone reproduction curves, black overprint, and/or the like.

In step S300, the raster image, and any associated fast path images, are merged and placed into a single output page raster image. Such placement includes positioning with respect to the output page coordinate system. In various exemplary embodiments, the raster image is an overlay image and the fast path image is an underlay with an opaque imaging model. In step S310 the resultant single output page raster image is packaged and transmitted to the printer. In various exemplary embodiments, the single output raster image will typically consist of four planes, one per color separation. Operation ends at step S320.

Specifically, conveying supplementary information about the page content to a raster image processing, such that the raster image processing can determine whether to "hand-off" the page to one of several available rendering paths, without fully decomposing the page is novel. Advantages of this method, over previously known methods, include, for example, sustained print performance such as enabling sustained raster generation and decomposition of 15-20 US Letter size color pages per minute. Also, superior image quality is achieved by conveying rendering hints that are used by the print controller to provide enhanced image quality.

Figure 7:
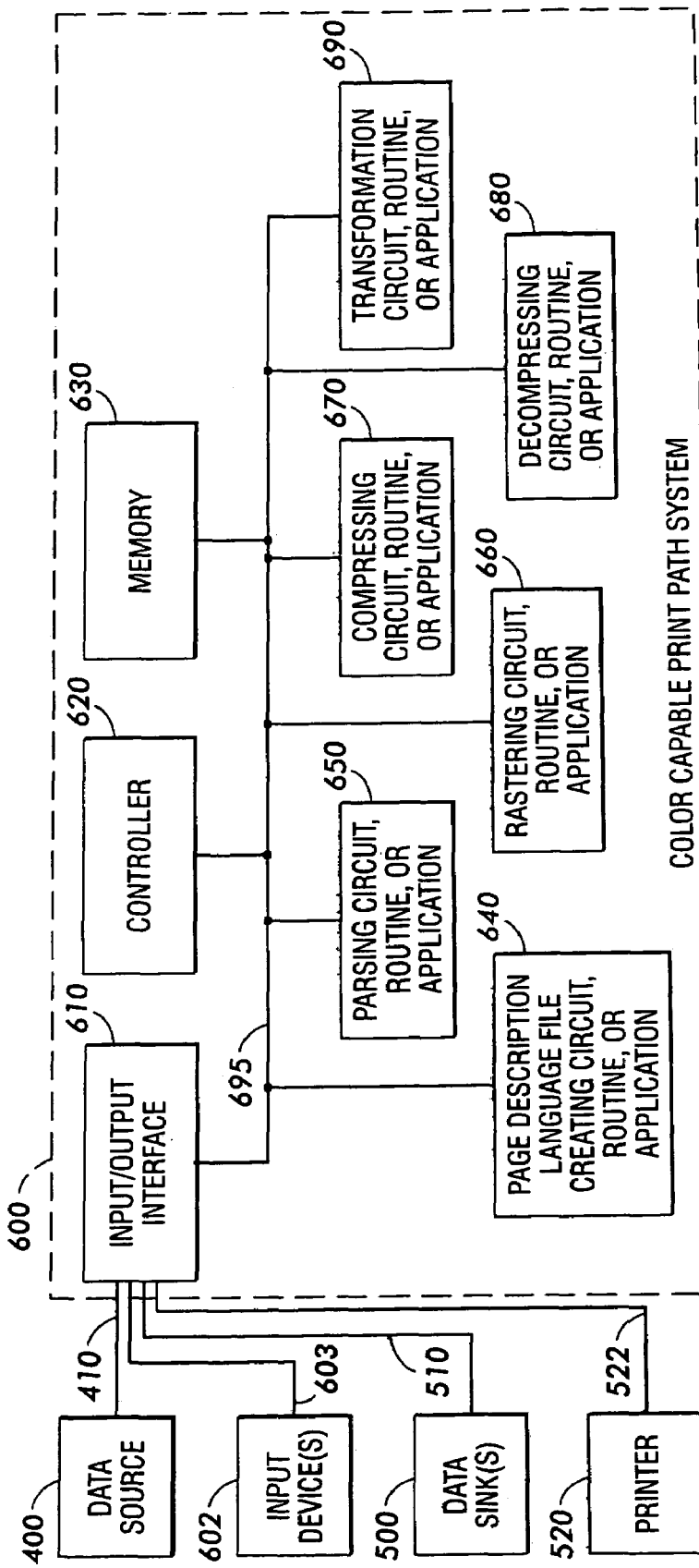
FIG. 7 is a block diagram of an exemplary embodiment of a system according to this invention.

FIG. 7 is a block diagram of an exemplary embodiment of a system 600 according to this invention for rapidly processing a raster intensive color documents. In FIG. 7, one or more user input devices 602 are connected over one or more links 603 to an input/output interface 610. Additionally, a data source 400 is connected over a link 410 to the input/output interface 610. A data sink 500 is also connected to the input/output interface 610 through a link 510.

Each of the links 410, 603, 510 can be implemented using any known or later developed device or system for connecting the one or more user input devices 602, the data source 400 and the data sink 500, respectively, to the input/output interface 610, including a direct cable connection, a connection over a wide area network or a local area network, a connection over an intranet, a connection over the Internet, or a connection over any other distributed processing network or system. In general, each of the links 410, 603, 510 can be any known or later developed connection system or structure usable to connect the one or more user input devices 602, the data source 400 and the data sink 500, respectively, to the input/output interface 610.

The input/output interface 610 inputs data from the data source 400 and/or the one or more user input devices 602 and outputs data to the data sink 500 via the link 510. The input/output interface 610 also provides the received data to one or more of a controller 620, a memory 630, a page description language file creating circuit, routine or application 640, a parsing circuit, routine or application 650, a rasterizing circuit, routine or application 660, a compressing circuit, routine or application 680, a transformation circuit, routine or application 690 and/or a printer 520. The input/output interface 610 receives data from one or more of the controller 620, the memory 630, the page description language file creating circuit, routine or application 640, the parsing circuit, routine or application 650, the rasterizing circuit, routine or application 660, the compressing circuit, routine or application 680, transformation circuit, routine or application 690 and/or the printer 520.

The memory 430 stores data received from the page-description language file creating circuit, routine or application 640, the parsing circuit, routine or application 650, the rasterizing circuit, routine or application 660, the compressing circuit, routine or application 670, the decompressing circuit, routine or application 680, the transformation circuit, routine or application 690 and/or the printer 520. For example, the original data, the page description language file, the parsed page description language content, the rasterized image and page content, the compressed raster image and/or the transformed images, may be stored in the memory 630. The memory 630 can also store one or more control routines used by the controller 620 to operate the color capable print path system 600.

The memory 630 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writeable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the circuits, routines or applications shown in FIG. 7 can be implemented as portions of a suitably programmed general purpose computer. Alternatively, each of the circuits or routines shown in FIG. 7 can be implemented as physically distinct hardware circuits within an ASIC, or using a FPGA, a page description language, a PLA or a PAL, or using discrete logic elements or discrete circuit elements. The particular form each of the circuits or routines shown in FIG. 7 will take is a design choice and will be obvious and predicable to those skilled in the art.

In operation, the data source 400, or user input device 602, creates fast path image files. The fast path image files are output over the link 410, or 603, respectively, to the color capable print path system 600. However, it should be appreciated that the image files could have been previously input into the color capable print path system 600.

The image is routed through the input/output device 610 via the controller 620 to the page description language file creating circuit, routine or application 640 where page description files referencing the fast path raster image files are created. A job ticket is also created at the data source 400, or user input device 602, and output separately from the fast path raster image file over the link 410, or 603, respectively, to the color capable print path system 600.

The job ticket and the fast path image files are sent under the control of the controller 620 to the memory 430 to be spooled prior to further processing. It should be understood that the job ticket and fast path image files may also be streamed with processing beginning prior to receipt and spooling of the job ticket and fast path image files.

To begin further processing, the job ticket and fast path image files are routed under the control of the controller 620 to the parsing circuit, routine or application 650 where the page description language content for the current page is parsed and decomposed.

The decomposed page content is then sent, under the control of the controller 620 to the rasterizing circuit, routine or application 660 where a pixel map of the page content is constructed using primitive operators and glyphs. Once the page is rasterized, the rasterized page is routed to the compressing circuit, routine or application 680 under the control of the controller 620. Compression techniques are used to compress the decomposed page content prior to being buffered in the memory 430 to await for a request from a printer 520 for output of the page raster image.

Upon receiving a request from the printer 520, the compressed decomposed page content is routed to the decompressing circuit, routine or application 680 where the compressed files are decompressed for further processing. The decompressed files are routed to the transformation circuit, routine or application 690 under the control of the controller 620 where the decompressed files and any associated fast path image files are positioned with respect to the output page coordinate system. The transformation circuit, routine or application 690 then packages and transmits the resultant single page raster image to the printer 520 via link 522.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of enabling improved print performance and image quality of printing raster image files, comprising:
   capturing digital image data;
   segmenting the digital image data;
   generating a page description language file of the digital image;
   parsing the page description language file from the digital image data;
   decomposing and merging the page description language file to create a rasterized image; and
   raster image processing the rasterized image.

2. The method of claim 1, wherein segmenting the digital image includes creating a raster image file and associated rendering hints of the captured digital image.

3. The method of claim 1, further comprising compressing and buffering the rasterized image after creating the rasterized image.

4. The method of claim 1, wherein raster image processing includes processing the rasterized image through a plurality of raster image processors, and the raster image processors perform parallel processing according to a first in and first out format.

5. The method of claim 3, further comprising decompressing the compressed and buffered rasterized image prior to processing.

6. A system for improving print performance and image quality of a printed raster image file, comprising:
   an input/output device; a controller;
   a page description language file creating circuit, routine or application that creates a page description language file of a captured digital image;
   a parsing circuit, routine or application that parses the page description language file from the digital image data;
   a rasterizing circuit, routine or application that rasterizes the parsed the page description language file and the digital image data;
   a compressing circuit, routine or application that compresses the rasterized page description language file and the digital image data;

a decompressing circuit, routine or application that decompresses the rasterized page description language file and the digital image data;

a transformation circuit, routine or application that transforms the decompressed page description language file and the digital image data in a form useful to an output device printer;

and a memory.

7. The method of claim 1, wherein decomposing is based on a determination of whether or not the page description language comprises a predetermined attribute.

8. The method of claim 7, wherein the page description language is decomposed and at least some of the segmented digital image data is not decomposed when the determination indicates that page description language comprises the predetermined attribute.

9. The method of claim 7, wherein the predetermined attribute comprises a page content identifier.

10. A method of enabling improved print performance and image quality of printing raster image files, comprising:

receiving a print request comprising a page description language and segmented digital image data;

parsing the page description language file;

determining whether the page description language comprises a predetermined attribute;

decomposing the page description language and segmented digital image data when it is determined that the page description language does not comprises the predetermined attribute;

decomposing the page description language and segmented digital image data when it is determined that the page description language comprises the predetermined attribute;

merging the page description language file to create a rasterized image; and raster image processing the rasterized image.

11. The method of claim 10, wherein the predetermined attribute comprises a page content identifier.

* * * * *